US006295213B1

(12) United States Patent
Smith (10) Patent No.: US 6,295,213 B1
(45) Date of Patent: Sep. 25, 2001

(54) CIRCUIT FOR EFFICIENTLY CLAMPING A POWER CONVERTER'S RESET VOLTAGE AND FOR PROVIDING AUXILIARY POWER

(75) Inventor: David Anthony Smith, Cummer Hill (GB)

(73) Assignee: Astec International Limited, Hong Kong (HK)

( * ) Notice: Subject to any disclaimer, the term of this patent is extended or adjusted under 35 U.S.C. 154(b) by 0 days.

(21) Appl. No.: 09/503,987

(22) Filed: Feb. 14, 2000

(51) Int. Cl.$^7$ ........................... H02M 3/315; H02M 7/122
(52) U.S. Cl. ............................. 363/21.01; 363/56
(58) Field of Search .................... 363/21, 20, 56, 363/16, 17, 97, 98, 132, 131; 323/282, 222

(56) References Cited

U.S. PATENT DOCUMENTS

| 4,286,314 | 8/1981 | Molyneux-Berry . | |
|---|---|---|---|
| 4,438,486 | 3/1984 | Ferraro . | |
| 4,607,322 | 8/1986 | Henderson . | |
| 4,652,809 | * 3/1987 | Barn .................................... | 323/282 |
| 4,754,385 | * 6/1988 | McDade et al. ...................... | 363/16 |
| 4,912,620 | 3/1990 | O'Dell . | |
| 5,694,303 | * 12/1997 | Silberkleit et al. .................... | 363/20 |

OTHER PUBLICATIONS

"Energy Efficient C–Dump Converters For Switched Reluctance Motors," Mir, Husain, Elbuluk, IEEE; pp. 968–973 (Jul. 1996).

"Development of a Unipolar Converter for Variable Reluctance Motor Drives," Ehsani, Bass, Miller, Steigerwald, IEEE Transactions on Industry Applications, vol. 1A–23, No. 3 (May/Jun. 1987).

"A Universal 100kHz Power Supply Using a Single HEXFET," Pelly, Ruttonska; Chapter 11 Application Note 939A No Date Available.

* cited by examiner

Primary Examiner—Rajnikant B. Patel
(74) Attorney, Agent, or Firm—Coudert Brothers (57) ABSTRACT

In a power converter whose power is supplied by an input power source, a circuit is disclosed for efficiently clamping the peak reset voltage across a primary switch of the power converter and for recycling the energy stored in the clamp during the OFF period of the switch back to the input power source via a second converter through the operation of a plurality of switching transistors in the second converter. The reset energy of the power transformer in the power converter can also be coupled to an auxiliary power circuit via a winding of a transformer in the second converter. The second converter can thus provide auxiliary or stand-by power to maintain the operation of critical system circuits, when the power converter is turned off, e.g., to conserve power, such as in the sleep mode of a portable PC.

18 Claims, 9 Drawing Sheets

See patent 4,607,322

FIG._3 (PRIOR ART)

See patent 4,286,314

FIG._4 (PRIOR ART)

See patent 4,438,486

FIG._5 *(PRIOR ART)*

See patent 4,912,620

Several windings on T2 powering (e.g.) internal control Vcc and a standby output rail

FIG._12  L1 Replaced with T2, D2 Supplying Power to Vcc (11.5V, 3.2W)
Main Converter at 150W (Circuit 3) Condition "A"
Main Converter off (Circuit 4) Condition "B"

FIG. 13

CIRCUIT FOR EFFICIENTLY CLAMPING A POWER CONVERTER'S RESET VOLTAGE AND FOR PROVIDING AUXILIARY POWER

FIELD OF THE INVENTION

The present invention relates to a novel switching power converter that clamps the peak turnoff voltage of the power switching transistor in the converter, and recycles the energy stored in the leakage inductance in the converter's transformer back to the input supply by means of a second converter that also can provide auxiliary power to the power converter's control circuit and/or other circuits. As a result, power conversion efficiency is improved, EMI is minimized, and a source of auxiliary power provided. The present invention preferably uses a forward converter as the main converter for converting a first DC voltage to a second DC voltage and a two switch buck converter to transfer power from a clamp capacitor back to the input supply and to generate a source of auxiliary power to power the control circuit of the forward converter.

BACKGROUND OF THE INVENTION

The forward converter is a common circuit topology used to transform electric energy from a source at a given potential to a destination load at a different potential. A typical forward converter includes a transformer having a primary winding and at least one secondary winding. The primary winding of the transformer is coupled to a source of power, usually DC power, via a primary switch or transistor. The secondary winding is coupled to a load via an output rectifier circuit comprising two commutating diodes and an output filter. The primary switch generally comprises a semiconductor switching device such as a FET or bipolar-junction transistor (BJT). When the primary winding is energized by the closing of the primary switch, i.e., the ON-period of the switch, energy is immediately transferred to the secondary winding, hence the name forward converter. In a typical forward converter, energy is stored in the transformer magnetizing and leakage inductances during the ON-period of the switch. During the OFF-period, the voltage across the transformer primary winding reverses, stored energy is dissipated, and magnetic flux in the core is reset. It is necessary to limit the voltage generated during the OFF-period to avoid damage to the switch or transistor.

More particularly, during the conduction or ON period of the switching transistor, current is transferred from the primary DC power source through the transformer to the output circuit. During the OFF period of the switching transistor, the magnetizing current in the transformer is returned to the primary DC source, resetting the flux in the transformer core, prior to the next cycle of operation.

Figure 1:
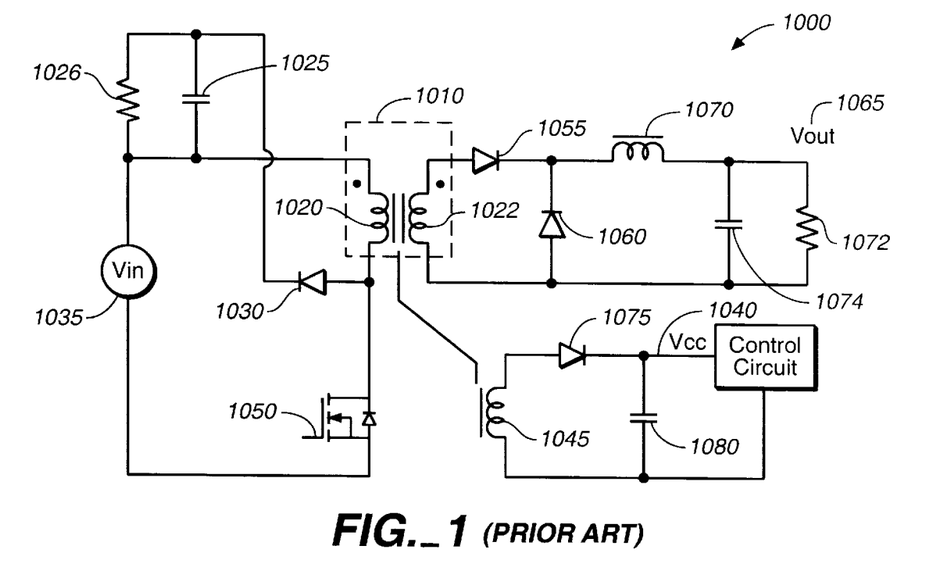
FIG. 1 is a circuit diagram of a standard forward converter having a diode and clamp capacitor according to the prior art.
Figure 2:
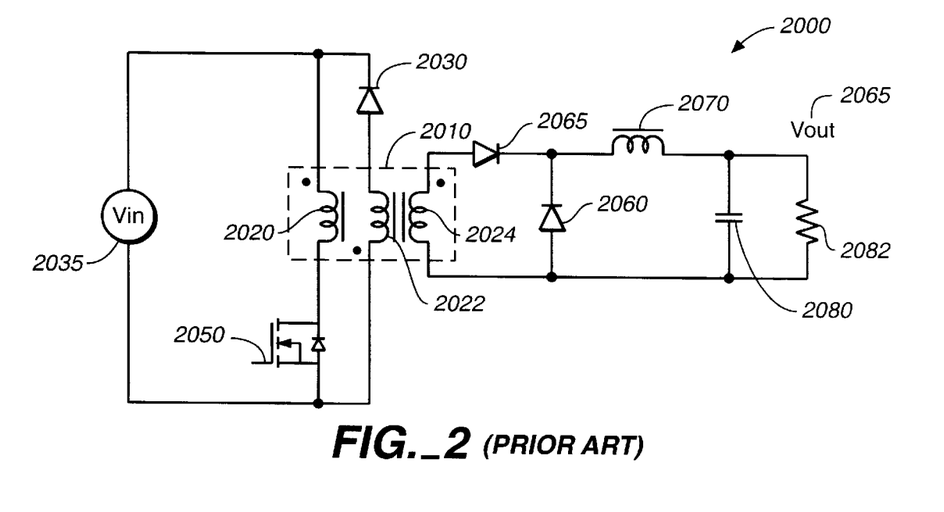
FIG. 2 is a circuit diagram of a standard forward converter having a clamp winding on the transformer according to the prior art.

FIGS. 1 and 2 illustrate two versions of a conventional forward converter wherein a third winding of the converter's transformer is used to limit the maximum reset voltage and to reset the core of the transformer when the primary switch is opened. Forward converter 1000 is shown in the circuit of FIG. 1 and comprises a transformer 1010 having a primary winding 1020 and a secondary winding 1022, a resistor 1026 in parallel with a clamp capacitor 1025 connected in series with a diode 1030, all of which is connected in parallel across the primary winding 1020, an auxiliary circuit 1040 connected to a third winding 1045, and a primary FET switch 1050. On the secondary side of transformer 1010 are the two commutating diodes 1055, 1060 which are coupled to an inductor 1070 to provide output power (Vout) to a load 1072 and output capacitor 1074.

Resistor 1026 acts to dissipate the energy in clamp capacitor 1025. Clamp capacitor 1025 along with diode 1030 limit the maximum reset voltage across switch 1050. Auxiliary circuit 1040 provides a source of power Vcc to the converter's control circuit via a diode 1075 and a capacitor 1080. Power is coupled to the converter from an input power source (Vin) which is connected across the series combination of the primary winding 1020 and the primary switch 1050. The power dissipated by the clamp in forward converter 1000 is often 5% to 10% of the output power (Vout), which is too high to be wasted as heat in the clamp resistor 1026.

Another simpler method for limiting the voltage generated during the OFF-period of a power supply system is shown in the forward converter 2000 shown in FIG. 2. The forward converter 2000 includes a third winding 2022 but it is connected across the input supply Vin just by a diode 2030. In this example, the third winding usually has the same number of turns as the primary, which means that the peak voltage developed across the switching transistor 2050 during the OFF period is twice the primary DC supply voltage. For a nominal rectified line input of 300V DC, the peak switch voltage would therefore be 600V, requiring a switching transistor voltage rating of at least 700V in such an example. Note that the maximum permissible conduction period or duty cycle of switching transistor 2050 is usually 50% of the total cycle time, to allow time for the transformer flux to be reset during the OFF period and avoid core saturation.

The above mentioned clamp winding methods improve the efficiency of a power converter, but they have disadvantages such as: a) the clamp voltage is proportional to, and increases with, the input voltage; b) the clamp winding can not be perfectly coupled to the primary winding, and so is unable to clamp all of the energy; and c) the high frequency oscillations between the coupling inductance and stray capacitances is a source of EMI.

It is also known in the art to employ other clamping methods to improve the efficiency of a power converter, such as the active clamp, but these methods do not completely resolve the foregoing disadvantages. See, for example, U.S. Pat. No. 4,441,146 wherein the third winding is eliminated and replaced by a series combination of a storage capacitor and an auxiliary switch coupled across either the primary or secondary winding. The auxiliary switch is operated counter to the primary switch, i.e., it is open when the primary switch is closed and closed when the primary switch is open.

Utilizing auxiliary converters to power a control circuit is also known. For instance, power for a control circuit is normally taken from a winding on the power transformer or from the input supply via an auxiliary converter. This auxiliary converter may be a linear regulator, which has been proven to be very inefficient, or a free running switching converter such as a flyback or blocking oscillator. A typical auxiliary converter, such as a free running converter, can generate a wide range of low frequency oscillations, resulting in EMI, due to the varying beat frequency between the main and auxiliary converters. Such a free-running converter is often unacceptable for certain telecommunication applications, such as telephone exchanges. The disadvantage of using these types of auxiliary converters is that it necessitates the costly and time-consuming task of synchronizing the auxiliary converter to the main converter.

Representative devices that utilize various clamping arrangements combined with converters to protect switching devices from high voltage transients and to recover the energy stored in the clamp during the OFF-period by using a switching means are described as follows: U.S. Pat. No. 4,607,322 to Henderson discloses an energy recovery snubber that includes a push-pull converter and clamp capacitor that returns energy to a supply by a second switch and by the windings on a transformer; U.S. Pat. No. 4,286,314 to Molyneux-Berry relates to an inverter circuit for minimizing switching power losses comprising a switch, clamp capacitor, and a second switch connected to an inductor coupled to a clamp capacitor, to resonantly discharge energy for each cycle, while returning that energy to the supply input; U.S. Pat. No. 4,438,486 to Ferraro for a low loss snubber for power converters involves a clamp capacitor, energy retrieved via separate (synchronized) flyback converter, where the FET in the flyback detects a higher voltage than the clamp, and experiences switching losses; U.S. Pat. No. 4,912,620 to O'Dell relates to a lossless clipper with peak regulation feature which comprises a forward converter and clamp capacitor, and a buck converter for returning clamped energy to a supply source, with optional regulation of the clamped voltage. The circuits described in the above-mentioned patents are illustrated in FIGS. 3–6, whereby transient energy is utilized, rather than wasted, in the OFF period of a power supply system.

Figure 3:
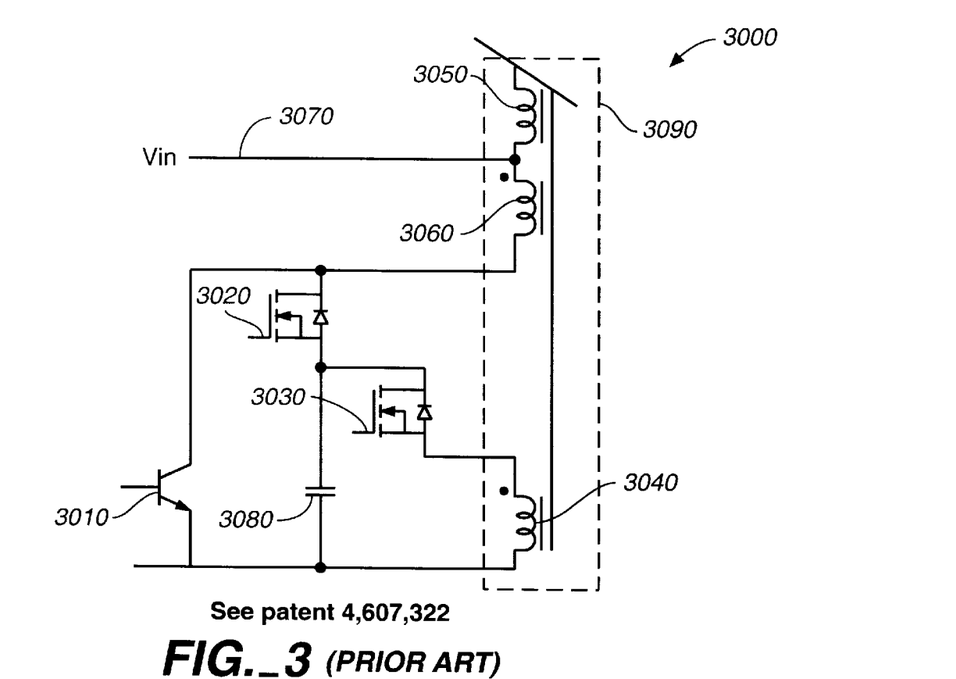
FIG. 3 is a circuit diagram of a known power converter incorporating a snubber circuit according to the prior art.

In FIG. 3, a snubber circuit 3000 is shown comprising a switch transistor 3010 connected to primary windings 3050, 3060 of the main transformer 3090. The transistor 3010 is operated between ON and OFF states by a switch control (not shown) so that alternating current power is developed in the secondary winding (not shown) of the transformer 3090. The snubber circuits 3020, 3030 are connected in series to the auxiliary primary winding 3040, which are inductively linked to the primary windings 3050,3060.

The snubber circuit 3020 in FIG. 3 includes a capacitor 3080, which is coupled to a switching transistor 3010 of the power converter. The switching transistor 3010 modulates the flow of current through the primary windings 3040, 3050, 3060 of the transformer 3090. The auxiliary primary winding 3040 is coupled by means of a second snubber switch 3030 to the junction between the first snubber switch 3020 and the capacitor 3080. Shortly before turning off the switching transistor 3010, the first snubber switch 3020 is closed and the second snubber circuit 3030 is opened so that the snubber capacitor 3080 is connected in parallel with the switching transistor 3010. When the power transistor is turned off, the transient energy of the primary winding 3060 of the transformer 3090 is stored by the snubber capacitor 3080. Then, the first snubber circuit 3020 is opened and the second snubber switch 3030 is closed to couple the transient energy to the auxiliary primary winding 3040 to possibly drive a load coupled to a secondary winding of the transformer 3090.

Figure 4:
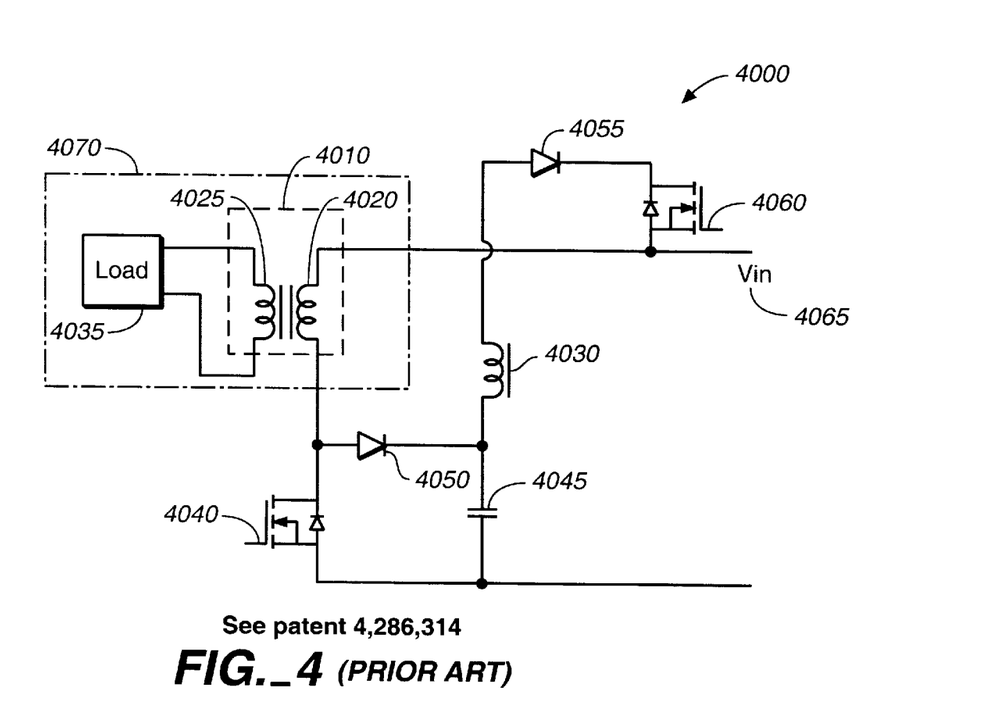
FIG. 4 is a circuit diagram of a known inverter circuit according to the prior art.

In FIG. 4, a known inverter circuit 4000 for minimizing switching power losses is shown. The circuit 4000 comprises a switch 4040 connected in series to a load 4035 across a transformer. A first diode 4050 and a clamp capacitor 4045 are serially connected so as to be in shunt with the switch 4040. A second diode 4055, inductor 4030, a second switch 4060 and the capacitor 4045 are connected in series. A power converter circuit 4070 consists of a transformer 4010 having a primary winding 4020 and secondary winding 4025 across the load 4035. Hence, the inverter circuit 4000 has a switch 4040 which is conductive periodically to provide pulse power from a power source 4065 to a load 4035. Diode 4050 and capacitor 4045 clamp the voltage of switch 4040. Second switch 4060, diode 4055 and inductor 4030 return the energy in the clamp capacitor 4045 back to the power source 4065.

Figure 5:
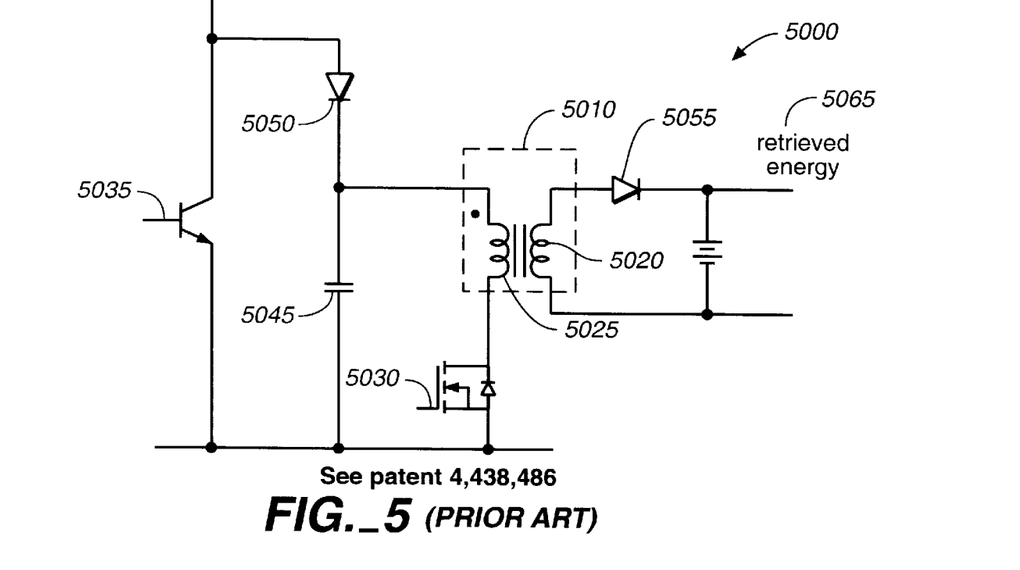
FIG. 5 is a circuit diagram of a known flyback converter according to the prior art.

In FIG. 5, a low loss snubber for power converter 5000 using a flyback converter is shown. The snubber 5000 comprises a capacitor 5045 in series with a diode 5050 and a energy retrieval circuit 5065. The capacitor 5045 and diode 5050 are connected in series across the first switch 5035. The diode 5050 is poled to conduct current to charge the capacitor 5045 when the first switch 5035 is turned off. The energy retrieval converter 5065 comprises a transformer 5010 having a primary winding 5020 and a secondary winding 5025, and a second switch means 5030 that is repeatedly turned off and when the first switch 5035 is in a closed position. An inductor means or the primary winding 5020 of the transformer 5010 is in series with the second switch 5030, and the capacitor 5045 transfers the energy stored in the inductor means 5020 to an external load when the second switch 5030 is opened.

Figure 6:
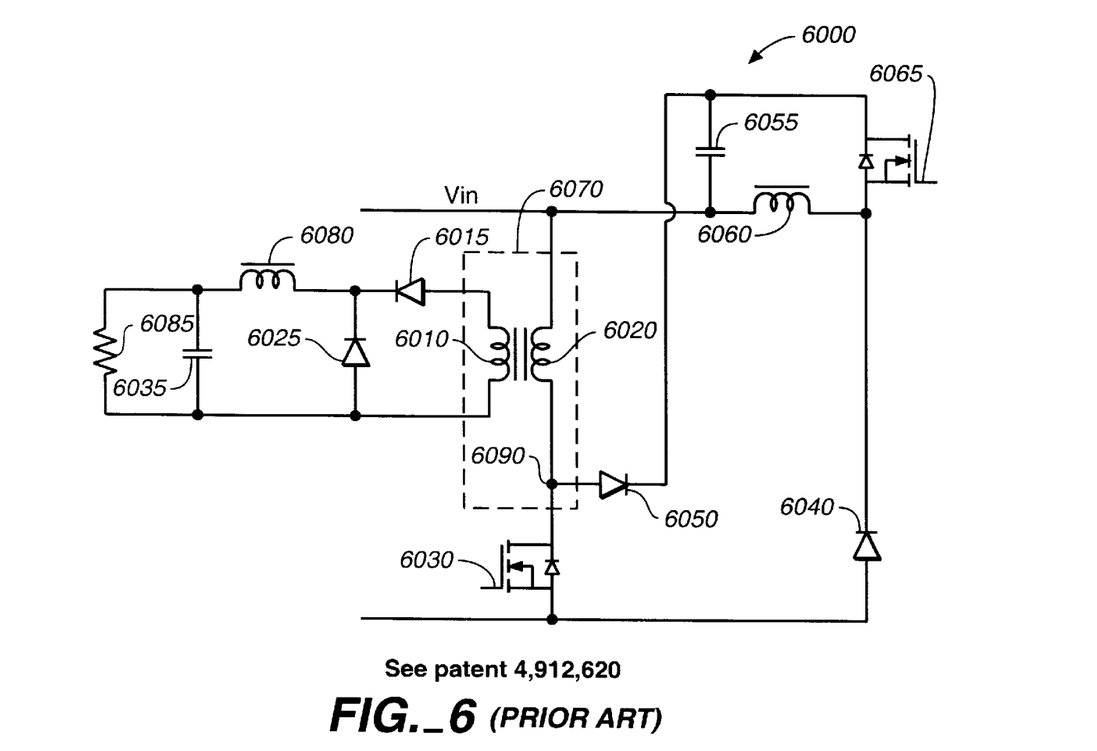
FIG. 6 is a circuit diagram of a known lossless snubber circuit coupled to a forward converter according to the prior art.

In FIG. 6, a snubber lossless clipper circuit 6000 having a peak regulation feature is shown. The clipper circuit 6000 limits or clamps the flyback voltage pulses generated by a transformer 6070 having a primary winding 6020 and a secondary winding 6010 arranged across a switching transistor 6030. The snubber circuit 6000 dissipates no energy. When the transistor is turned off, the snubber circuit 6000 modulates the magnitude of the flyback pulses to thereby modulate the voltage across the transformer 6070. In the snubber circuit 6000, when the transistor 6030 is turned on, the current flows through the primary winding 6020 to switch the transistor 6030 to ground, which causes the current to be delivered to the secondary winding 6010 of the transformer 6070 to a choke inductor 6080 and to a load 6085. When the transistor 6030 is turned off, the voltage at the lead 6090 begins to raise. The snubber or clipper circuit 6000 coupled to the transformer 6070 prevents the voltage at the lead 6090 from increasing beyond a value which could damage the transistor 6030.

Although the above-described known approaches for clamping a converter's reset voltage and recovering the energy stored in the clamp during the transistor OFF period have created some efficiencies in returning energy back to the input power supply, other problems remain. One problem with switches 3030, 4060, 5030 and 6065 in FIGS. 3–6 is that they all turn on with voltage across them, i.e., they are all hard switching devices, which generates switching noise and EMI, and creates switching power losses. The other problem with prior art converters is that if a third winding on the main power transformer were used to provide auxiliary power, it wouldn't function when the main converter is shut off. The transformer in FIG. 5, or another winding added to the inductors 4030 or 6060 would only give auxiliary power when the main converter is running. The prior art solution is therefore to include an additional auxiliary power converter that runs continuously to ensure the availability of auxiliary power when needed.

There is therefore a need in the power conversion art for a means of efficiently clamping a forward converter reset voltage with minimum losses in energy and minimum EMI, and that can also provide auxiliary power even when the main converter is shut down.

SUMMARY OF THE INVENTION

An object of the present invention is to provide a novel circuit for efficiently clamping the reset voltage of a main converter so as to overcome problems associated with the prior art. The present invention is also capable of providing auxiliary power without requiring the use of a third transformer clamping winding.

More specifically, it is an object of the present invention to provide a relatively low-cost, stable high frequency power converter including a main forward converter and a buck converter that clamps and re-directs energy to the power converter's input power source with minimum loss in energy and with minimal EMI at high frequencies.

Another object of the present invention to provide a power supply that can generate stand-by power to maintain the operation of critical system circuits, when the main converter is turned off to conserve power, such as in the sleep mode of a portable PC.

Still another object of the present invention is to provide a switching converter synchronized to the main power converter so as to minimize interference with the control of the power supply system, and to eliminate beat frequencies.

In particular, it is object of the present invention is to provide a two switch buck converter that transfers power from a clamp capacitor to the input supply voltage with high efficiency and low noise.

An additional object of the present invention is to appropriately scale the buck converter winding leakage inductance and capacitor output to shape the current generated by the diode rectifier in the auxiliary power generator into half sinusoid pulses to eliminate reverse recovery losses and noise.

Yet another object of the present invention is to provide a forward converter that supplies an output voltage to a load and clamps, by a diode connected to a capacitor, the maximum voltage of the converter's power switch during the forward converters reset period.

Yet another object of the present invention is to provide a buck converter to supply auxiliary power to a circuit by allowing energy to flow from the input supply voltage to the circuit when the main power converter is turned off, i.e., during the sleep mode of a laptop computer, to conserve power.

In accordance with one aspect of the present invention, in a main power converter having at least one transformer including a primary winding and a secondary winding, said secondary winding coupled to an output rectifier circuit whose output is coupled to an output load, and having a primary switch connected in series between a voltage input source and said primary winding, and a clamp for clamping the transformer's reset voltage, reset voltage circuitry is provided for recycling energy in said transformer back to the input power supply when the primary switch is turned off, thereby minimizing losses due to transformer leakage inductance and electromagnetic interference on said primary switch, said circuitry comprising: a clamp capacitor for clamping the reset voltage generated by said transformer when said primary switch is turned off and for storing said reset energy; a second converter having a plurality of switches coupled in series with said clamp capacitor; wherein the second converter is synchronized to said main converter to regulate the flow of energy in said clamp capacitor. The main converter is preferably a forward converter powered by an input voltage source for supplying a regulated output voltage to said load. However, the main converter can be a flyback converter or a push-pull converter. In addition, the main converter can be a boost converter or a sepic converter where there are voltage spikes, e.g., due to wiring inductances. The primary switch can also be either a FET or an IGBT.

Preferably, the second converter includes first and second switches for regulating the flow of said energy in said clamp capacitor. These first and second switches are preferably driven alternately with a deadtime between each switch transistor to prevent said first and second switches from conducting simultaneously. In a preferred embodiment of the present invention, the power converter reset voltage circuit also includes an auxiliary power generator coupled to the second converter for receiving energy output from said clamp capacitor or from the input power source, depending on the state of the first and second switches. The auxiliary power generator preferably includes a diode in series with a capacitor for generating the voltage Vcc needed to power the forward converter's control circuit.

Furthermore, the second converter means is preferably a buck converter that also functions to return energy from said clamp capacitor to said input voltage source. The buck converter includes a transformer including a first winding and a second winding, said first winding coupled to said first and second switches, and said second winding coupled to said auxiliary power generator. The buck converter is preferably a zero-voltage-switched quasi-square-wave buck converter.

Alternatively, the present invention comprises a reset voltage circuit in a forward converter coupled to an input voltage source for supplying power to an output load while minimizing transformer leakage inductance losses and electromagnetic interference in said converter, said converter having a first transformer including a first primary winding and a first secondary winding, said first secondary winding coupled to an output rectifier circuit whose output is coupled to said output load, a primary switch connected to said first primary winding, said reset voltage circuit comprising a first diode and a clamp capacitor for clamping the reset voltage across the primary switch when said primary switch opens, an auxiliary converter having a first switch, a second switch, and a second transformer including an auxiliary primary winding and an auxiliary secondary winding, said auxiliary primary winding coupled between said first and second switches, said auxiliary primary winding also coupled to said storage capacitor; said auxiliary secondary winding coupled to an auxiliary power generator; said auxiliary power generator comprising a second diode in series with a second capacitor for powering the control circuit of the forward converter.

Other objects, features and advantages according to the present invention will become apparent from the following detailed description of the illustrated embodiments when read in conjunction with the accompanying drawings in which corresponding components are identified by the same reference numerals.

DETAILED DESCRIPTION OF THE PRESENT INTENTION

Figure 7:
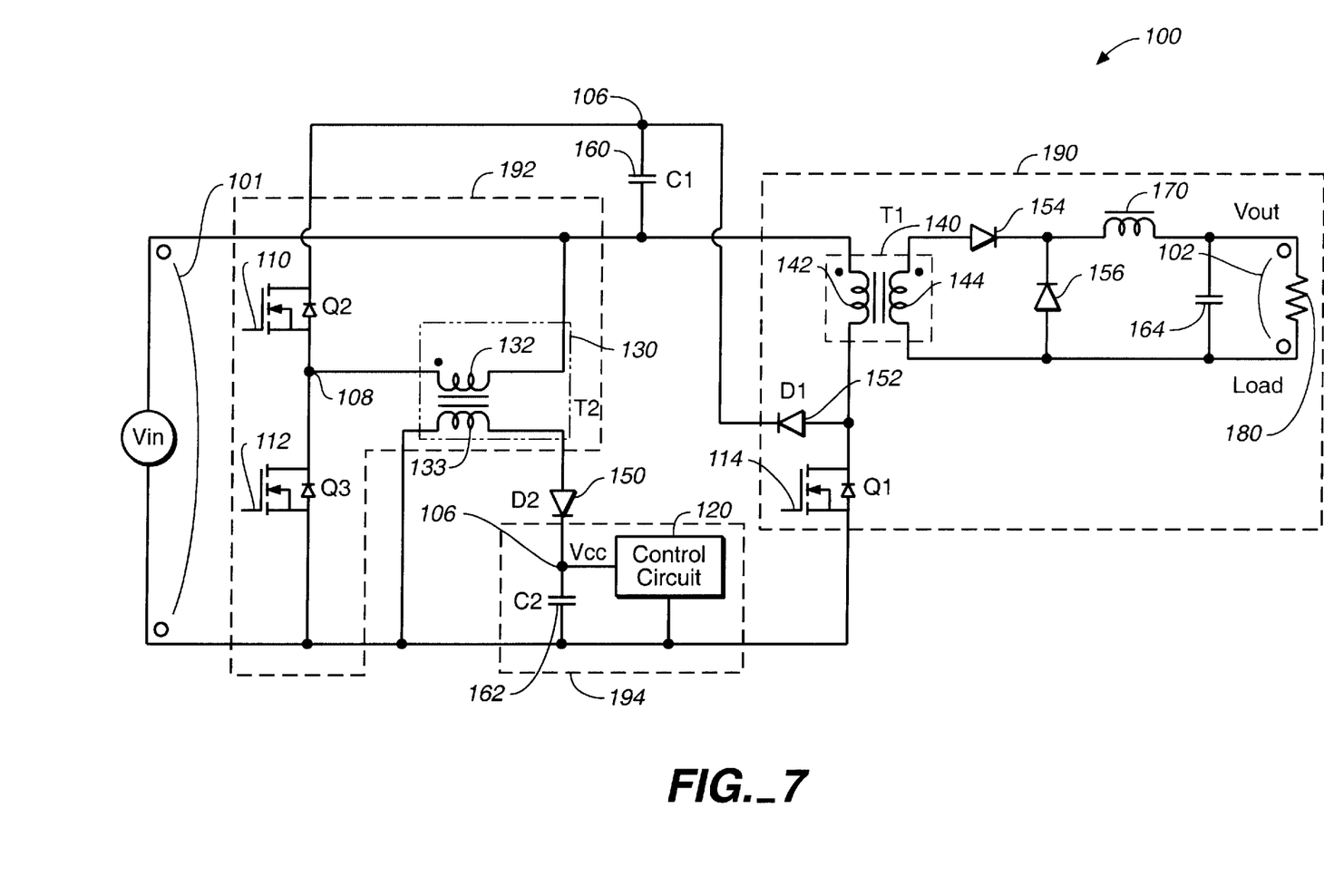
FIG. 7 is a circuit diagram of a preferred embodiment of a forward converter having a reset voltage circuit according to the present invention.

A first embodiment of a power converter having a reset voltage circuit according to the present invention is shown at 100 in FIG. 7. Power converter 100 includes an input port 101 coupled to a power source for receiving input power (Vin) and an output load 180 at an output port 102 for receiving an output voltage (Vout). Additionally, power converter 100 comprises a converter 190 coupled to a buck converter 192 by a clamping capacitor 160 and a diode 152, an auxiliary power circuit or generator 194 connected to the output of the buck converter at transformer 130, and a control circuit 120 for providing the control signals needed by the switching transistors in converter 190 and buck converter 192.

Converter 190 is preferably a forward converter that includes a power switch 114, a transformer 140 having a primary winding 142 and a secondary winding 144, commutation diodes 154 and 156, an inductor 170, and a capacitor 164 coupled to the load 180. The forward converter supplies an output voltage (Vout) to the load 180 as will be described in detail below. Alternatively, converter 190 could be a flyback converter or a push-pull converter, where a clamp is needed to limit the peak turn-off voltage spike coupled to power switch 114 when switch 114 turns off, as a result of the leakage inductance of the transformer 140. It is also possible to use the clamp with a boost converter or a sepic converter, where there are voltage spikes due to wiring inductances. It is not necessary that only one converter be used in the circuit 100 of the present invention shown in FIG. 7. Several converters can be clamped without departing from the spirit of the present invention. When several converters are used, a diode 152 is used in each converter 190 to feed a single clamp capacitor 160, so that energy is returned to Vin through a single buck converter circuit 192. Note also that, although power switch 114 is typically a FET, the reset voltage circuit according to the present invention is particularly useful for clamping IGBT switches. This is because an IGBT has only a tenth the avalanche breackdown capability of a FET.

The buck converter 192 includes a first switch 110, a second switch 112, and a transformer 130 having a primary winding 132 and a secondary winding 133. The buck converter transfers power from the clamp capacitor 160 to the input voltage (Vin) or from Vin to the auxiliary power generator (Vcc), as will be described in detail below. The buck converter 192 is preferably a zero-voltage-switched quasi-square-wave buck that is highly efficient and emits low noise. In particular, the buck converter 192 is most preferably a ZVS quasi-square-wave converter. Analysis and waveforms for exemplary such converters are given in a paper entitled "CONSTANT-FREQUENCY CONTROL OF QUASIRESONANT CONVERTERS" by D.Maksixnovic, S.Cuk presented at the High Frequency Power Conversion 1989 Conference (pp. 241–253).

Figure 8:
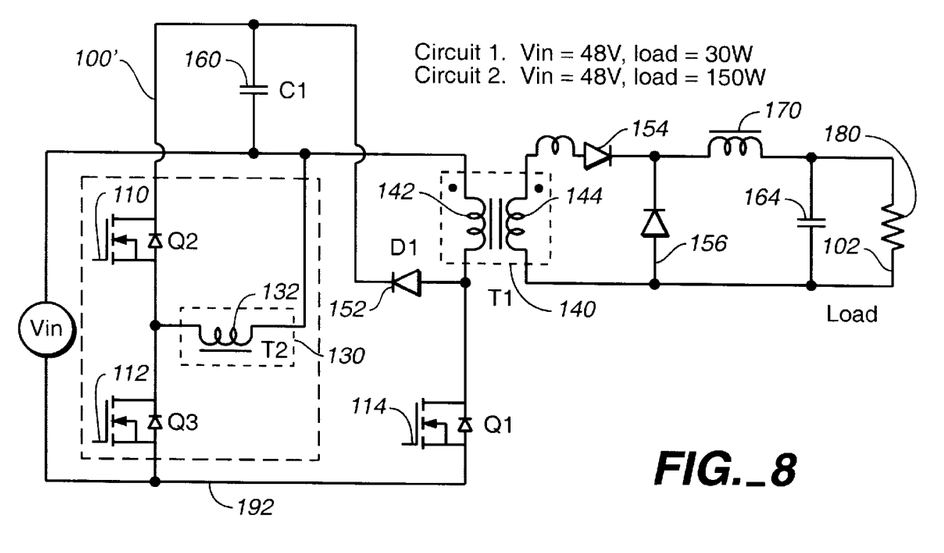
FIG. 8 is a circuit diagram of a preferred embodiment of the forward converter reset voltage circuit of FIG. 7 according to the present invention without the auxiliary power circuit.

The auxiliary power generator 194 is connected to the buck converter 192 by the secondary winding 133 of the buck transformer 130. The auxiliary power generator 194 includes an auxiliary diode 150 arranged in series with an auxiliary capacitor 162 for outputting auxiliary power to control circuit 120. The secondary winding 133 of transformer 130 supplies the energy received by the clamp capacitor 160 to the auxiliary power generator 194 to generate the voltage (Vcc) for the control circuit 120. When the auxiliary power generator 194 is omitted, as shown in FIG. 8, the primary winding 132 of transformer 130 comprises only an inductor, preferably a 100 μH inductor. Clamping of the reset voltage according to the present invention does not require auxiliary power generator 194. That is, the auxiliary output provided by transformer 130 is not required for clamp operation.

The switches 110 and 112 of buck converter 192 and the switch of 114 of forward converter 190 are preferably field effect transistors (FETs), each having a corresponding gate, drain, and source. Switches 110, 112, and 114 are switched on and off to generate ON and OFF periods. In the buck converter 192, switches means 1 1 0 and 112 are coupled in series at a node 108 and are coupled across the input port 101. In forward converter 190, switch 114 is coupled between primary winding 142 of transformer 140 and the ground return of Vin at input port 101.

As shown in FIG. 7, the primary winding 132 of transformer 130 of buck converter 192 is coupled to the clamp capacitor 160. The other side of clamp capacitor 160 is connected to switch 110 at node 106. The other side of primary winding 132 is connected between the two switches 110 and 112 at intermediate node 108.

Primary switch 114 of the forward converter 190 is coupled to the primary winding 142 of the transformer 140 and to clamp diode 152. Diode 152 is coupled to clamp capacitor 160 at node 106 to enable capacitor 160 to clamp the maximum voltage on the switch 114 when switch 114 turns off and the core transformer 140 begins to reset. The secondary winding 144 of transformer 140 is connected to commutation diodes 154 and 156, the output of which is coupled to inductor 170. The inductor 170 is connected in series to the capacitor 164. The load 180 is connected in parallel with the capacitor 164 across the output port of 102.

Switches 110 and 112 in buck converter 192 operate to transfer energy in the clamp capacitor 160 back to the input supply (Vin) or to the auxiliary power generator 194. As described below with reference to FIG. 9, buck converter 192 is also able to couple Vin to power generator 194 to thus provide Vcc to control circuit 120 even when the forward converter 190 is not running.

Primary switch 114, transformer 130 and commutating diodes 154 and 156 form a conventional forward converter. The duty cycle of primary switch 114 is set to provide the desired 5V output to load 180. Switches 110 and 112 are driven alternately, with their duty cycle set for approximately 65 volts across clamp capacitor 160 and 12 volts across capacitor 162 in the auxiliary power generator 194, to create voltage Vcc to operate control circuit 120. The peak voltage across primary switch 114 is clamped by clamp diode 152 and capacitor 160 to a voltage Vclamp. That is, Vclamp is voltage across capacitor 160 resulting from the input voltage plus the reset voltage of transformer 140:

$Y_{CLAMP} = V_{IN} + V_{RESET}$

Exemplary operating values for the power converter circuit 100 in FIG. 7 include a voltage input Vin in the range of 36V to 72V, preferably 48V, while the voltage Vout output to the load 180 of the forward converter 190 is a maximum of 150W, i.e., 5V at current of 30 amperes (30A). The frequency of forward converter 190 preferably is 200 kHz. Vclamp must be high enough to allow transformer 140 to completely reset during the off-period of switch 114. By use of the two buck converter switches 110 and 112, the auxiliary power at a voltage Vcc of 12 volts and the Vclamp voltage across capacitor 160 are constant and regulated.

Exemplary operating conditions for the circuit 100 are shown in TABLE I.

TABLE I

| | |
|---|---|
| $V_{IN}$ | 36 VDC~72 VDC |
| $V_{OUT}$ | 5 VDC, 30 A |
| $V_{CC}$ | 11.3 V |
| $V_{CLAMP}$ | 65 VDC |
| $V_{CAPACITOR}$ 162 | 12 VDC |
| Frequency | 200 kHz |

When the input voltage (Vin) is at low line or at a minimum, e.g., 36V, and the high output voltage (Vout) is at 6V, the duty cycle of the forward converter 190 will be approximately 0.57. The maximum duty cycle is preferably set to 0.7 to allow the main control loop to regulate during load transients. The reset voltage (Vreset) must be more than (36V×0.7)÷(1−0.7)=84V. Hence, at a 36V voltage input, the clamp voltage (Vclamp) should be 36V+84V=120V. At a high input voltage, when the input voltage (Vin) is at 72V, and Vreset is the same as above at 84 V, using the formula $V_{CLAMP} = Y_{IN} + V_{RESET}$, the clamp voltage will be 156V.

However, it is known that the maximum duty cycle at a high input voltage for a forward converter need only be 0.27 plus an allowance for transients, i.e., 0.35. The reset voltage (Vreset) at a high input voltage should preferably be more than (72V×0.35) ÷0.65=39V. The clamp voltage (Vclamp) therefore only needs to be 72V+39V=111V. Thereby when designing the power converter 100 circuit of the present invention, by reducing the voltage across the clamped capacitor 160 at a high input voltage, the primary switch can have a lower voltage rating, such that a 150V instead of a 200V rated FET can be used, thereby producing lower resistance and conduction losses.

The voltage across the capacitor 160 preferably can therefore be controlled to provide the lowest acceptable Vclamp, as Vin varies between a minimum and maximum range of 36V to 72V as shown in TABLE II.

TABLE II

| | | | | |
|---|---|---|---|---|
| $V_{IN}$ | 36 V | 48 V | 60 V | 72 V |
| $D_{CYCLE}$ (maximum) | 0.7 | 0.53 | 0.42 | 0.35 |
| $V_{RESET}$ (minimum) | 84 V | 54 V | 43 V | 39 V |
| $V_{CLAMP}$ | 120 V | 102 V | 103 V | 111 V |

As can be seen from TABLE 11, if the clamp voltage is regulated to 120 volts, instead of regulating the reset voltage to 84 volts, then you would have very close to the minimum values shown.

In FIG. 8, the circuit 100' of the present invention is shown without the secondary winding 133 of transformer 130 and without the auxiliary power generator 194 as shown in FIG. 7. This is because the auxiliary power generator 194 is not necessary for clamp operation as described above. Instead, for FIG. 8, primary winding 132 of transformer 130 acts only as an inductor 130', preferably a 100 µH inductor. Otherwise, the circuit in FIG. 8 is identical to FIG. 7.

Figure 9:
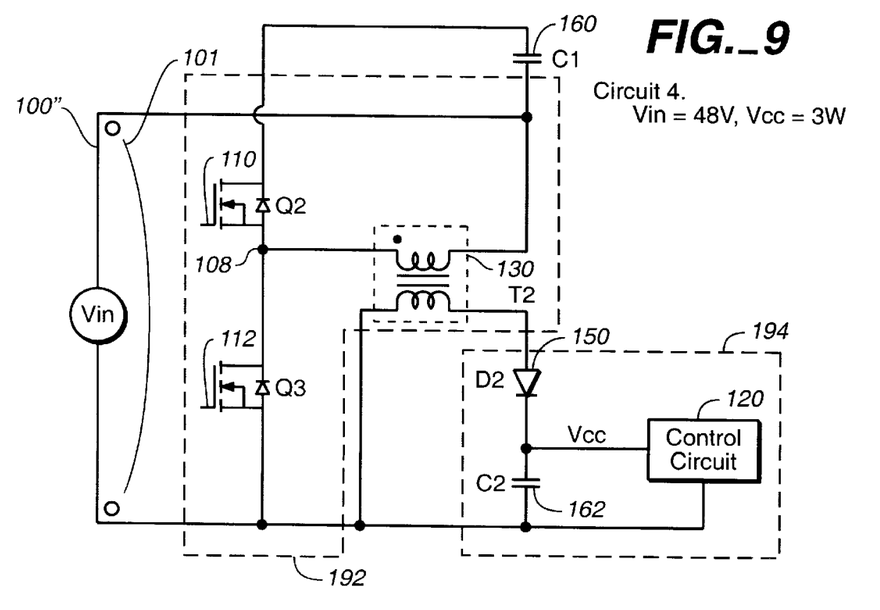
FIG. 9 is a circuit diagram of the preferred embodiment of the converter of FIG. 7 according to the present invention illustrating circuit operation with the main converter shut down.

In the circuit 100" shown in FIG. 9, the forward converter 190 is omitted. Otherwise, the circuit 100" is identical to the circuit 100 shown in FIG. 7. Circuit 100" corresponds to the condition when the forward converter 190 is turned off, and auxiliary power to drive control circuit 120 is taken directly from the input supply (Vin). That is, secondary winding 133 on the buck transformer 130 couples power to the auxiliary power generator 194 when the forward converter is shut down, as a function of switches 110 and 112.

As seen in TABLE II, the reset voltage across the clamped capacitor 160, and therefore the auxiliary voltage transferred Vcc, varies by more than 2:1, which may be a disadvantage. Such a disadvantage can be easily overcome by having the auxiliary power generator 194 redesigned so that Vcc is proportional to the peak-peak transformer swing.

Figure 10A:
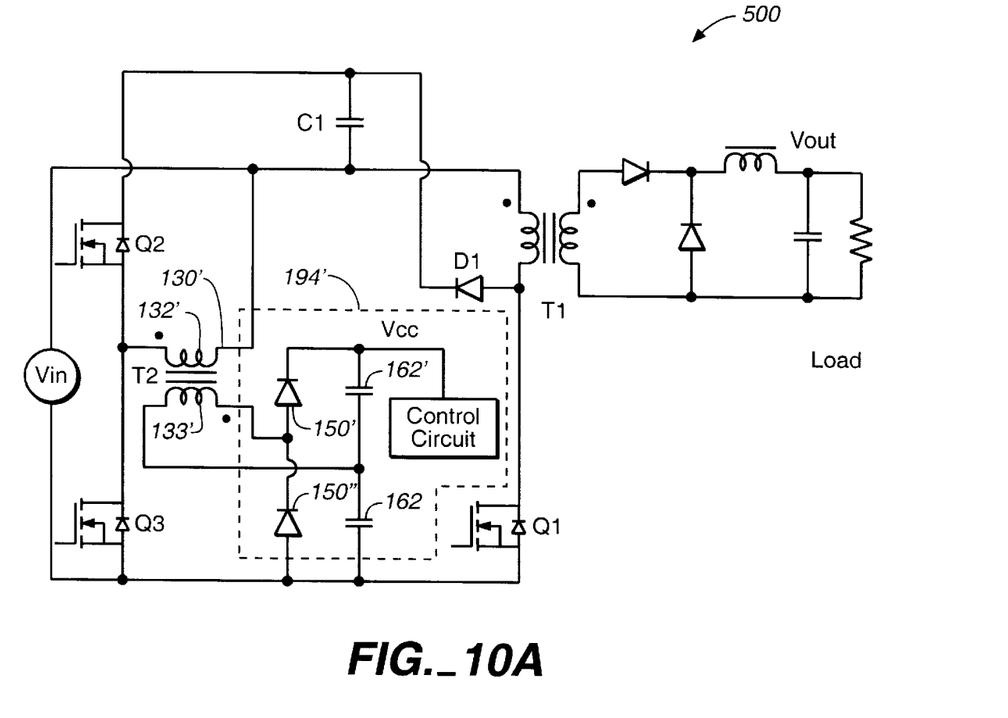
FIG. 10A is a circuit diagram of another embodiment of a forward converter having a reset voltage circuit wherein a voltage doubler comprises the auxiliary power circuit for providing power to a control circuit.

In an alternative embodiment of the present invention as shown in FIG. 10A, the power converter circuit 500 includes an auxiliary power generator circuit 194' having at least two diodes 150', 150" in series and two capacitors 162'. 162" in series connected as a voltage doubler circuit voltage Vcc is thus proportional to the peak to peak transformer voltage swing. This alternative circuit 500 having a voltage doubler driven by secondary winding 133' on the buck transformer 130' to a voltage that is proportional to the Vclamp yielding an advantageous lower clamp voltage when the voltage outputted by the transformer 130' is low, in return for an added minimal cost.

Figure 10B:
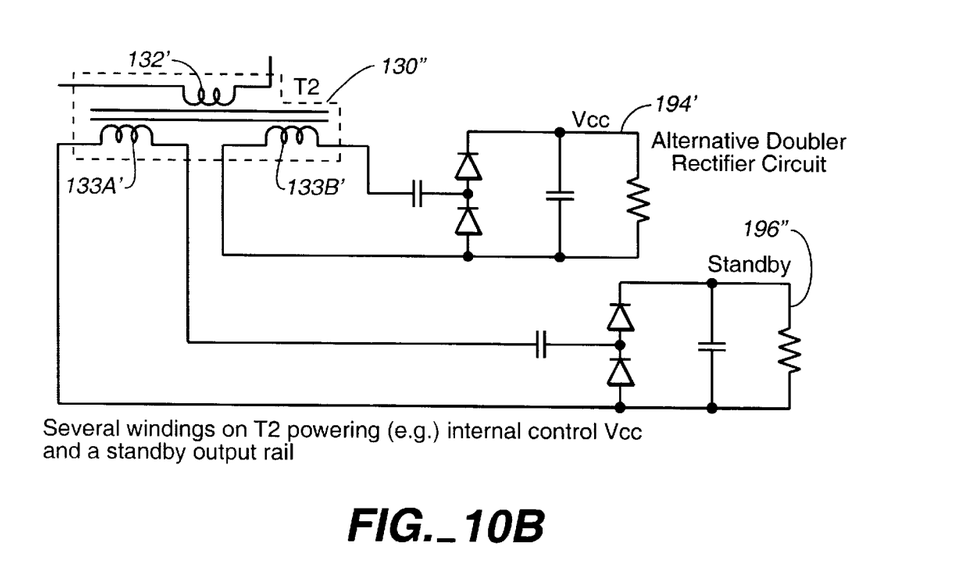
FIG. 10B is a circuit diagram of an alternative voltage doubler circuit of FIG. 10A wherein a first doubler rectifier provides power to the control circuit and a second doubler rectifier provides power to a second circuit.

Alternatively, the voltage doubler 194' described in FIG. 10A can be duplicated by adding- one or more additional secondary windings to transformer 130", as shown in FIG. 10B. Providing of several secondary winding 133B' enable a plurality of auxiliary power sources for various circuits, such as to control circuit 120' as well as to a standby output rail 196"

In another alternative arrangement, the windings 133 on transformer 130 may feed energy into the output voltage (Vout), or any other supply rail. The AC voltage on these windings 133 may be converted to DC by any of the standard rectification circuits. The simple peak diode circuit in generator 194 (FIG. 7) and the alternative voltage doubler circuit generator 194' (FIG. 10) are simple ways of providing regulated, low power outputs, while switches 110, 112 are controlled to regulate Vclamp.

Alternatively, the rectified winding voltage of winding 133 of transformer 130 could alternatively supply an inductor filter, to reduce the peak and RMS currents in this rectification circuit. The converter 192 would be a half bridge converter or a clamped forward converter.

Buck converter 192 can preferably operate as a multi-resonant clamped flyback converter by choosing an appropriate transformer 130 leakage inductance and capacitor 162, so as to shape the rectifier current of diode 150 into half-sinusoid pulses to eliminate recovery losses and noise. Such a circuit is described in U.S. Pat. No. 5,430,633, which is commonly owned and is incorporated herein by reference. The clamped flyback converter preferably would have a secondary-side resonant circuit which shapes the current waveform in the secondary winding 133 and generator 194 to reduce RMS current values to improve conversion efficiently.

Having described the circuits in FIGS. 7–9, the following exemplary components values and converter parameters are provided in TABLE 3 to aid one of ordinary skill in the art in making and using the present invention. These values and parameters are not intended to limit the present invention in any manner.

TABLE 3

| Transformer 130 | N = 5.4:1; $L_{primary}$ = 100 µH; $L_{secondary}$ = 3.4 µH |
|---|---|
| Transformer 140 | N = 3:1; $L_{primary}$ = 72 µH; $L_{secondary}$ = 8.0 µH |
| Transistors (Buck Switches 110, 112) | IRFD210 |
| Transistor (Primary Switch 114) | IRF250 |
| Clamp Capacitor 160 | 1 µF |
| Auxiliary Capacitor 162 | 2.2 µF |
| Auxiliary Diode (Rectifier) 150 | MBR140P |
| Clamp Diode (Rectifier) 152 | MUR120 |
| Main Converter Diodes (Rectifier) 154, 156 | MBR4020 |
| Main Converter Capacitor 164 | 2000 µF |
| Load Resistance 180 | 167 ohms |
| Inductance 170 | 3 µH |
| Typical Time for $t_1$ to $t_6$ | 2 µs |
| Typical Time for $t_0$ to $t_1$ | 1 µs |

Figure 11:
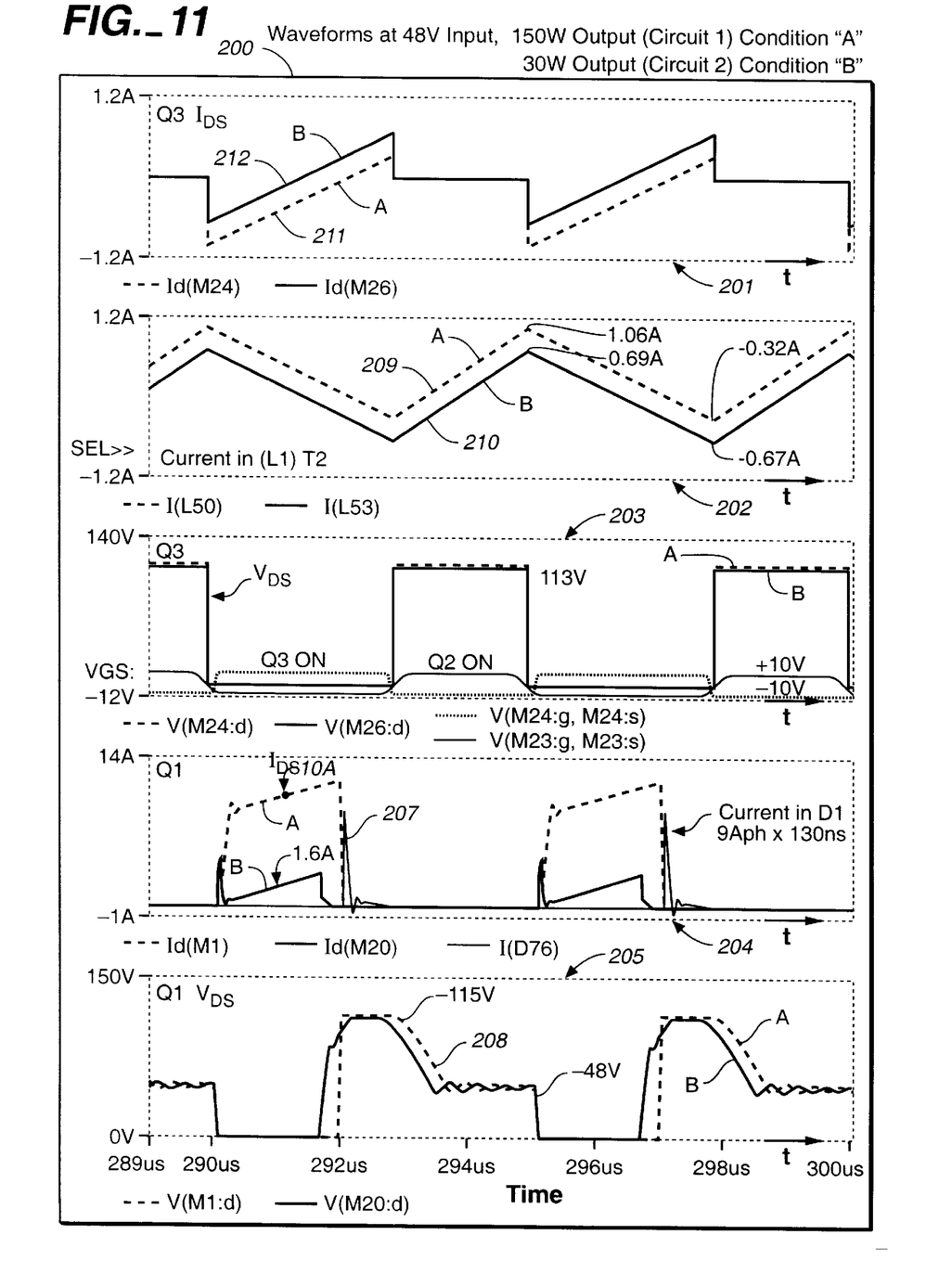
FIG. 11 is a timing diagram of key voltages and currents of the forward converter shown in FIG. 8 under various loading conditions.
Figure 12:
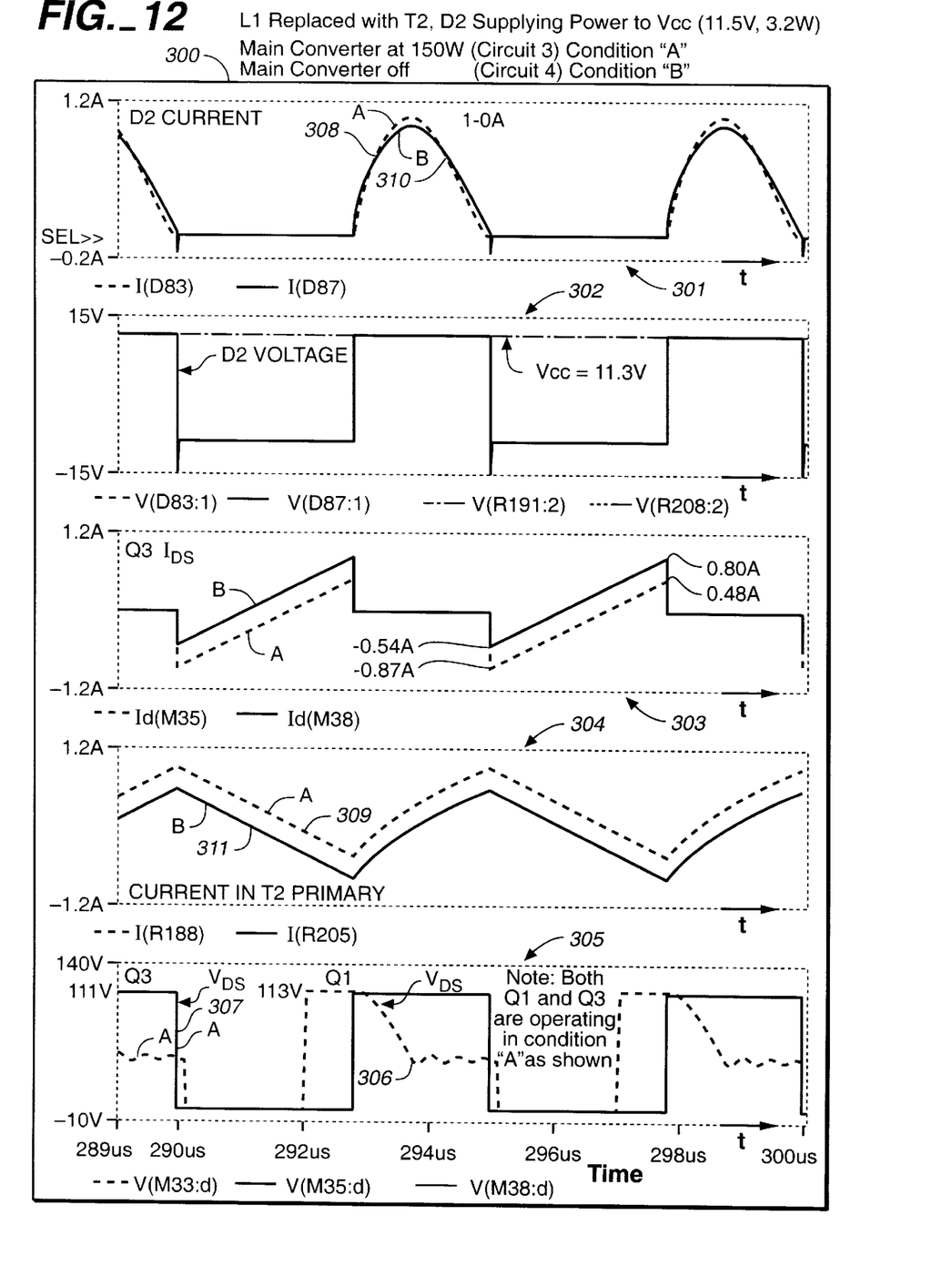
FIG. 12 is a timing diagram of key voltages and currents of the forward converter shown in FIGS. 7 and 9 under various load conditions.
Figure 13:
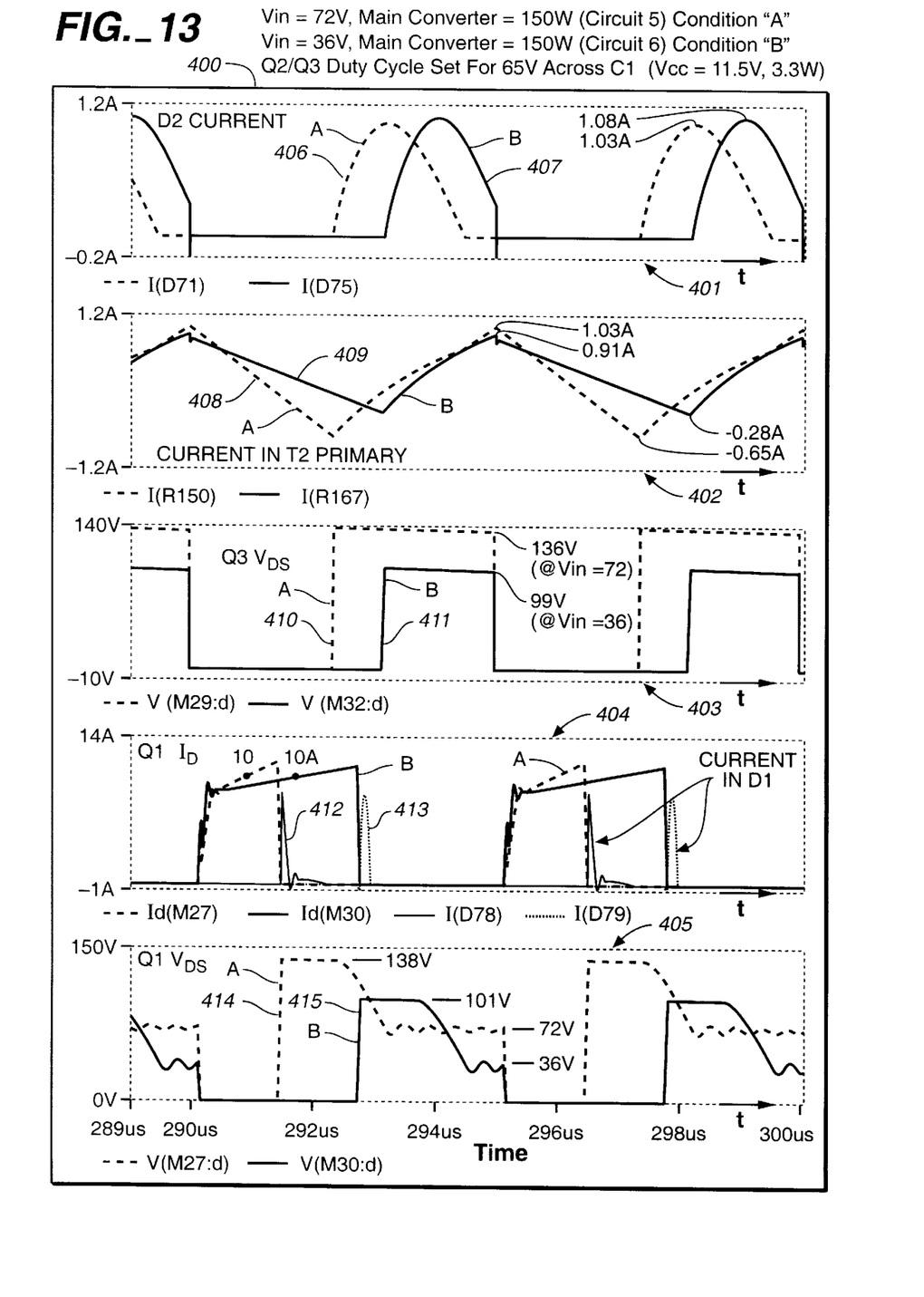
FIG. 13 is a timing diagram of key voltages and currents of the forward converter shown in FIG. 7 showing the effect of an increased input voltage.

A set of waveforms generated by Pspice is illustrated in FIGS. 11–13. These waveforms show various circuit operations under different conditions of load and input voltage described in FIGS. 7–9 in two different conditions. Condition A will be depicted with a dotted line, while Condition B will de depicted with a solid line. The waveforms depict the voltages and currents in the converter switch means 110, 112, and 114 for circuits 100, 100', 100" in FIGS. 7–9, respectively.

The operation of the power converter 100 is described in further detail below with reference to a timing diagram 200 shown in FIG. 11. FIG. 11 illustrates selected voltages and currents in converter 100 using the components and parameters in TABLES 1–3. Namely, an input voltage of 48VDC, an output load current of 30A and an output voltage of 5VDC are assumed and illustrated in condition A. For condition B, the input voltage remains at 48VDC as does the output voltage at 5VDC, however, the output load is lower, e.g. 30W instead of 150W.

Timing diagram 200 comprises a number of graphs 201–205, each showing a signal as a function of time. Time lines t0 through t6 cut vertically through the graphs at selected time points, as described below. The vertical axis measures the amount of current I in time lines 201, 202, and 204, while voltages are measured in the vertical axis for time lines 203 and 205. For Condition A, the waveforms are shown in dotted lines, and for condition B the waveforms are shown in solid lines.

In circuit 100' in FIG. 8, the auxiliary circuit 194 is omitted. Transformer T2 is replaced with a 100 µH inductor.

The primary winding 142 of forward converter 190 has a magnetizing inductance, preferably 72 µH, that provides a magnetizing current of 1.3A peak-peak, storing approximately 16 µJ of energy. The total of the leakage inductance plus wiring inductance of the transformer 140 is equivalent to a single inductor of 100 nH in the secondary winding 144. The energy stored in this inductance is 45uJ when the load current is 30A for condition A and 2 µJ when the load current is at 6A for condition B. The total energy (16uJ+45uJ×200 KHz) is 12W that must be dissipated or re-cycled when the primary switch 114 of converter 190 is turned off.

In FIG. 11, in time line 204, the corresponding waveforms for conditions A and B for the current IDS through primary switch 114 are shown at 207. As seen, current 207 to the clamp diode 152 (at a 5V power output and a 30A current output) as being a spike of current, when the current 206 in transformer 140 is rapidly ramped down to zero, followed by a smaller current as the transformer magnetizing current reduces to zero.

In time line 205, the voltage $V_{DS}$ 208 across the primary switch 114 may not reach Vclamp at light load, if the value of Vclamp is set high. The transformer magnetizing inductance goes through a half cycle resonance with a FET and snubber capacitance as $V_{DS}$ goes up to a peak and then returns to be held at the voltage level of Vin, 48 volts. The buck converter 192 switches 110, 112 are driven alternately with a deadtime to prevent overlap, i.e. to prevent both FETs from conducting simultaneously, as shown in time line 203.

The voltage on clamp capacitor 160 is set by the duty cycle of the buck switch means 110, 112 and balances the positive and negative voltseconds across the transformer 130 of the buck converter 192. (Switch means 112 on-time)× (Vin)=(Switch means 110 on-time)×(Voltage across the clamp capacitor).

The inductance of the transformer 130 is chosen so that the peak—peak ripple current is more than twice the maximum DC bias current that flows in this winding. When the power transfer is zero, the DC bias current in the transformer 130 is zero, and the current waveforms in the switch means 110, 112 and transformer 130 of the buck converter are symmetric positive and negative about zero as shown in time line 202. Increasing power transfer results in an increasingly positive flow of DC current from the clamp capacitor 160 to Vin. In FIG. 11, which reflects FIG. 8, there is no auxiliary power (Vcc) being generated. With main power at 150W for Condition A, and 30W for Condition B, the current waveform 209 in time line 202 of inductor 130 ramps between 1.06A and −0.32A for Condition A, while the current waveform 210 for Condition B ramps between 0.69A and −0.67A. Waveform 209 has a DC bias of +0.37A, showing that there is a power flow of 0.37A×48V=18W being returned to the power source Vin.

In FIG. 11, as power transfer increases, the current of the switch means 112 $I_{DS}$ 211 (for Condition A), 212 (for Condition B) becomes more negative at turn-on, and less positive at turn-off as shown on time line 201. $I_{DS}$ 211, 212 should be positive when switch 112 turns off, so that the voltage at the drain of switch 112 will rise to the positive rail and then current will flow into the source of switch 110. Switch 112 will then turn on with zero voltage across it, so that switch 112 operates in a "Zero Voltage Switching" (ZVS) mode.

The operation of the power converter 100 is described in further detail with reference to timing diagram 300 shown in FIG. 12, which illustrates the operation of the circuit in FIG. 7. FIG. 12 shows selected voltages and currents in converter 100 using the components in TABLE 2. As in FIG. 11, the input voltage remains at 48VDC, an output load 180 of 150W and the auxiliary voltage Vcc of 12VDC (3W) are assumed and illustrated in condition A. For condition B, the voltages and current reflect the circuit in FIG. 9, where the main converter is turned off, where the input voltage remains at 48VDC and the auxiliary voltage is also 3W. Timing diagram 300 comprises a number of graphs 301–305, each as a function of time. Time lines $t_o$ through $t_7$ cut vertically through the graphs at selected time points, as described below. The vertical axis measures the amount of load current I in time lines 301, 303 and 304, while voltage is measured in the vertical axis for time lines 302 and 305. Again, the waveforms for Conditions A and B are shown by dotted lines and solid lines, respectively.

In FIG. 12, some of the auxiliary power supplied to Vcc in FIG. 7 comes from the clamp capacitor 160. In time line 305, the VDS waveform 306 for switch 114 of the forward converter and the VDS waveform 307 for switch 112 of the buck converter 192 are shown synchronized to the same frequency, but such synchronization of the same frequency is not necessary for correct operation of the circuit 100 in FIG. 7.

In time line 301 of FIG. 12, the waveform of the current 308 of the auxiliary diode 150 is shown as a half sinusoid curve due to the small size of the leakage inductance of the transformer 130 and the fact that auxiliary capacitor 162 is chosen to have a small value. As a result, a half cycle resonance is completed within the on time of switch 110. However, the shape of the current pulses of the auxiliary diode 150 need not be half sinusoidal for optimum performance of the circuit 100 in FIGS. 7–9. It is preferable to set the capacitance value of the auxiliary capacitor 162 at a large enough value, however, to ensure a reasonably small Vcc ripple voltage, e.g. 0.5 volts peak to peak at 12 volts. If that is done, the current waveform of the auxiliary diode 150 then becomes only a part of a sinusoid waveform, which means that the current shoots upwards while the buck converter switch means 110 is on, then steps down to zero when the switch means 110 is turned off and the buck converter switch means 112 is turned on. It is preferable that the auxiliary diode 150 should therefore be an ultra-fast recovery type diode to avoid circuit ringing, and reverse recovery losses when the current in the auxiliary diode 150 is rapidly turned off.

The sinusoidal current 308 of the auxiliary diode 150 in time line 301 of FIG. 12 influences the shape of the current 309 in the primary winding 133 of transformer 130 in time line 304. The waveform 309 in time line 304 differs with the triangle triangular current 206 for the transformer without the output or the inductor 130 and the auxiliary circuit 194 as shown in FIGS. 8 and 11.

In time line 304, the 3W of auxiliary power and 150W of main power causes the current 309 in the primary winding 133 of the transformer 130 to peak between +0.87A and −0.48A, while the average primary current in transformer 130 is lower than the current waveform 206 shown in FIG. 11 for circuit 100 in FIG. 8, due to less power being returned to Vin.

In condition B of FIG. 12, that reflects the operation of the circuit shown in FIG. 9, where the main converter 190 is shut off, the auxiliary current 310 in time line 301 of the auxiliary diode 150 remains unchanged when the auxiliary power is delivered to Vcc. Even though the current 311 in the primary winding 133 of the transformer 130 of the buck converter 192 in FIG. 9 retains the same waveform as the current 309 in FIG. 8 without the auxiliary power, the DC bias is 0.33A lower to, and negative, due to power now flowing from Vin to Vcc.

In FIG. 13, the effect of varying the input voltages of the power converter of the present invention embodied in the circuit 100 of FIG. 7 is illustrated. The operation of the power converter 100 is described in further detail with reference to timing diagram 400. FIG. 13 illustrates selected voltages and currents in converter 100 using the component table in TABLES 1–3. For condition A, the input voltage is preferably 72VDC, with the main converter has a load of 150W and the auxiliary voltage remains at 3W. For condition B, the input voltage is lowered to 36VDC, while the output load and auxiliary power remains the same as for condition A.

Timing diagram 400 comprises a number of graphs 401–405, each as a function of time. Time lines $t_o$ through $t_7$ cut vertically through the graphs at selected time points and the vertical axis measures the amount of load current I in time lines 401–402, while voltage is measured in the vertical axis for time lines 403 and 405.

In time lines 401–405, the higher voltage condition A is shown in dotted lines, while the lower input voltage for condition B is shown in solid lines. At high input voltage, the duty cycle of switch 114 of forward converter 190 is reduced to maintain a 5V output voltage. The duty cycle of switch 112 of buck converter 192 is also reduced so that the 65V is maintained across clamp capacitor 160 and 12V is maintained across the auxiliary capacitor 162. By regulating these voltages across capacitors 160, 162, the clamp voltage 414, 415 will increase with the input voltage Vin, varying from 72V to 36V as shown in time line 405. The peak current in the magnetizing and leakage inductances of the transformer 130 of the forward converter 190 is unchanged, hence the current 412, 413 through the clamp diode 152 and power into the clamp capacitor 160 do not change with a varying input voltage Vin, as shown in time line 404. However, the peak-peak current and DC bias 408, 409 in the primary winding 133 of transformer 130, as shown in time line 402, will vary with a changing input voltage Vin.

A worst case design must be done at load conditions giving maximum power returned to Vin from the forward converter 190, and at minimum input voltage Vin. These conditions yield a maximum DC bias and the lowest peak-peak ripple current in transformer 130 of buck converter 192. It is preferred that the DC bias be less than half the peak to peak ripple current, to ensure that switch 110 of the buck converter 192 turns off with positive current flow into the drain of switch 110, and that zero voltage switching (ZVS) operation be maintained. The current 406, 407 of the auxiliary diode 150 may not have sufficient time available during the shortened switch 110 on time, at a minimum Vin, to complete a half sinusoid oscillation waveform, as shown in the time line 401. The completion of that waveform is not necessary. Turning off the current of the auxiliary diode 150 shortly before the current has naturally reached zero will result in a small amount of noise and reverse recovery loss, as shown by the waveforms 406, 407. It has been found that by designing the current sinusoid waveform of the auxiliary diode 150 to be narrower and taller, its RMS value will increase and hence increase the conduction loss of the transformer 130. As a result, the waveforms 406, 407 of the current in the auxiliary diode 150 at varying Vin inputs illustrates a reasonable compromise for optimum performance.

Although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

What is claimed is:

1. In a power converter coupled to an input voltage source for supplying power to an output load, said converter having a first transformer including a first primary winding and a first secondary winding, said first secondary winding coupled to an output rectifier circuit whose output is coupled to said output load, a primary switch connected to said first primary winding, and a control circuit for controlling the switching of said primary switch, a reset voltage circuit for recycling the magnetization energy in said first transformer back to said input voltage source and for providing a source of auxiliary power, comprising:
   a clamp diode;
   a clamp capacitor in series with said clamp diode and coupled between said input voltage source and said primary switch for clamping the reset voltage across the primary switch when said primary switch turns off and for storing the reset energy generated thereby;
   an auxiliary converter having a first switch, a second switch, and a second transformer including an auxiliary primary winding and an auxiliary secondary winding, said auxiliary primary winding coupled between said first and second switches, said auxiliary primary winding also coupled to said clamp capacitor, said first and second switches operating to couple the stored energy in said clamp capacitor to said input voltage source; and
   an auxiliary power generator coupled to said auxiliary secondary winding for generating said auxiliary power.

2. The reset voltage circuit of claim 1 wherein said power converter is flyback converter for supplying a regulated output voltage to said load.

3. The reset voltage circuit of claim 1 wherein said power converter is a push-pull converter for supplying a regulated output voltage to said load.

4. The reset voltage circuit of claim 1 wherein said power converter is a boost converter for supplying a regulated output voltage to said load.

5. The reset voltage circuit of claim 1 wherein said power converter is a sepic converter for supplying a regulated output voltage to said load.

6. The reset voltage circuit of claim 1 wherein said first and second switches are driven on and off alternately with a deadtime to prevent said first and second switches from conducting simultaneously.

7. The reset voltage circuit of claim 1 wherein the auxiliary power generator comprises a diode in series with a capacitor coupled to said auxiliary secondary winding of said second transformer.

8. The reset voltage circuit of claim 1 wherein said auxiliary converter is a buck converter.

9. The reset voltage circuit of claim 1 wherein the input voltage source includes positive and negative terminals, wherein said clamp capacitor is coupled to said positive terminal of said input power input voltage source, and wherein said first and second switches are coupled in series between the junction of said clamp capacitor and clamp diode and the negative terminal of said input voltage source, the connection point between said switches defining a node, said auxiliary primary winding coupled between the positive terminal of said input voltage source and said node.

10. The reset voltage circuit of claim 8 wherein the buck converter is a zero-voltage-switched quasi-square-wave buck converter.

11. The reset voltage circuit of claim 1 wherein said power converter comprises a forward converter.

12. The reset voltage circuit of claim 1 wherein the auxiliary power generated by said auxiliary power generator powers said control circuit, and wherein said first and second switches operate to couple energy to said auxiliary power generator from said clamp capacitor or from said input power source.

13. The reset voltage circuit of claim 12 wherein said control circuit also controls the operation of said first and second switches and wherein the switching of said first and second switches is at the same frequency as the switching of said primary switch.

14. In a power converter for supplying regulated power to an output load, said converter coupled to an input voltage source having positive and negative terminals and having a primary switch, a first transformer including a first primary winding and a first secondary winding, said first primary winding coupled in series with said primary switch to said positive and negative terminals of said input voltage source, said first secondary winding coupled to an output rectifier circuit whose output is coupled to said output load, and a control circuit for controlling the switching of said primary switch to provide said regulation of said output power, a reset voltage circuit for recycling the energy in said first transformer back to said input voltage source and for providing a source of auxiliary power, comprising:
   a clamp diode;
   a clamp capacitor connected in series with said clamp diode between the positive terminal of said voltage source and the junction of said first primary winding and said primary switch, for clamping the reset voltage across the primary switch once said primary switch turns off and for storing the reset energy generated thereby;
   an auxiliary converter having a first switch, a second switch and a second transformer including an auxiliary primary winding and an auxiliary secondary winding, said first and second switches coupled in series between the junction of said clamp capacitor and said clamp diode and the negative terminal of said input voltage source, the connection point between said switches defining a node, said auxiliary primary winding coupled between the positive terminal of said input voltage source and said node, said first and second switches operating to couple the stored energy in said clamp capacitor to said input voltage source; and
   an auxiliary power generator coupled to said auxiliary secondary winding for generating said auxiliary power.

15. The reset voltage circuit of claim 14 wherein the auxiliary power generated by said auxiliary power generator powers said control circuit, and wherein said first and second switches operate to couple energy to said auxiliary power generator from said clamp capacitor or from said input power source.

16. The reset voltage circuit of claim 14 wherein said control circuit also controls the operation of said first and second switches, and wherein the switching of said first and second switches is synchronized with the switching of said primary switch.

17. The reset voltage circuit of claim 14 wherein said auxiliary power generator comprises a second diode and a second capacitor, said second diode and second capacitor coupled in series between said auxiliary secondary winding and the negative terminal of said input voltage source.

18. The reset voltage circuit of claim 14 wherein said auxiliary power generator comprises second and third diodes and second and third capacitors coupled in parallel, one terminal of said second auxiliary secondary winding coupled to the junction between said second and third diodes and the other terminal of said auxiliary secondary winding coupled to the junction between said second and third capacitors for generating auxiliary output power having a doubled voltage.

* * * * *